United States Patent
Marshall, Jr. et al.

[11] Patent Number: 5,678,784
[45] Date of Patent: Oct. 21, 1997

[54] SPACE VEHICLE AND METHOD

[75] Inventors: Preston F. Marshall, Jr., Manassas; Mel Chaskin, Clifton, both of Va.

[73] Assignee: Vanguard Research, Inc., Fairfax, Va.

[21] Appl. No.: 391,171

[22] Filed: Jan. 10, 1995

Related U.S. Application Data

[63] Continuation-in-part of Ser. No. 111,335, Aug. 23, 1993, abandoned, which is a continuation of Ser. No. 492,809, Mar. 13, 1990, abandoned.

[51] Int. Cl.$^6$ .............................. B64G 1/00; B64G 1/64
[52] U.S. Cl. .................. 246/2; 246/158 R; 246/63
[58] Field of Search ........................ 244/2, 900, 901, 244/158 R, 63, 160, 13, 49, 161

[56] References Cited

U.S. PATENT DOCUMENTS

| | | |
|---|---|---|
| 3,131,894 | 5/1964 | Jalbert . |
| 3,135,482 | 6/1964 | Girard ........................... 244/49 |
| 3,197,158 | 7/1965 | Rogallo ..................... 244/160 X |
| 3,261,571 | 7/1966 | Pinnes ........................ 244/172 X |
| 3,285,175 | 11/1966 | Keenan ............................ 244/2 |
| 3,285,546 | 11/1966 | Jalbert . |
| 3,309,045 | 3/1967 | Kinney . |
| 3,335,985 | 8/1967 | Neal . |
| 3,375,280 | 3/1968 | Nicolaides . |
| 3,437,285 | 4/1969 | Manfredi et al. ............. 244/172 |
| 3,480,238 | 11/1969 | Barish . |
| 3,893,641 | 7/1975 | Sutton . |
| 3,972,495 | 8/1976 | Jalbert . |
| 4,015,801 | 4/1977 | Womble et al. . |
| 4,050,653 | 9/1977 | Sayers ............................ 244/2 |
| 4,175,722 | 11/1979 | Higgins . |
| 4,191,349 | 3/1980 | Pravaz . |
| 4,265,416 | 5/1981 | Jackson .......................... 244/2 |
| 4,363,458 | 12/1982 | Jones et al. . |
| 4,406,433 | 9/1983 | Radkey et al. . |
| 4,580,747 | 4/1986 | Pearson ..................... 244/158 R |
| 4,623,108 | 11/1986 | Musick . |
| 4,637,576 | 1/1987 | Ravnitzky . |
| 4,705,238 | 11/1987 | Gargano . |
| 4,729,530 | 3/1988 | Jalbert . |
| 5,031,857 | 7/1991 | MacConochie .................. 244/49 |

FOREIGN PATENT DOCUMENTS

| | | | |
|---|---|---|---|
| 0217507 | 4/1987 | European Pat. Off. ............... 24/160 |
| 0264030 | 4/1988 | European Pat. Off. .................. 244/2 |
| 2229155 | 9/1990 | United Kingdom .................... 244/2 |

OTHER PUBLICATIONS

Science, "Rockets from Balloons" Time vol. LXVI No. 4 Jul. 25, 1955 p. 62.

Space Object Assisted Recovery Final Technical Report [CDRL A004], by John F. Kantak et al., May 12, 1987 Title Page and Report Document Page.

*Primary Examiner*—Galen L. Barefoot

[57] ABSTRACT

A space vehicle has two stages: one containing an air motor; the other containing a rocket propellent motor. After the space vehicle has been launched, flexible wings such as parafoils can be used to recover stages of the space vehicle. In addition, flexible wings such as a parafoil can be used to aid in the delivery payload in the second stage into its orbital state.

18 Claims, 5 Drawing Sheets

SPACE VEHICLE AND METHOD

This application is a continuation-in-part of application Ser. No. 08/111,335 filed on Aug. 23, 1993, which was a continuation of Ser. No. 07/492,809 filed on Mar. 13, 1990 (both abandoned) the entire contents of which are hereby incorporated by reference.

BACKGROUND OF THE INVENTION

The present invention relates to space launch vehicles. More particularly the present invention relates to an apparatus and methods for placing space launch vehicles in orbit with the aid of flexible lifting wings.

Flexible wings such as kite, ram-air parachutes and multi-cell wing type ram-air canopies have been used in a large number of low performance, primarily gliding applications at relatively low altitudes. There are a specific number of canopy formations and control methods, aerodynamic augmentation of the air foil surface and construction details of these flexible wings.

DESCRIPTION OF RELATED ART

In Jalbert, U.S. Pat. No. 3,131,894, issued May 5, 1964, there is disclosed a multi-cell glide canopy parachute. The underside of the canopy of the parachute is provided with a plurality of cells which are open at the bottom and which communicate at their upper ends with longitudinal air flow channels located under the canopy. There are air outlets or vents at the rear end of the parachute. With this structure, various turning effects are possible with the parachute to thereby control flight direction and landing.

Another prior art patent that shows the use of flexible wings is Nicolaides, U.S. Pat. No. 4,375,280, issued Mar. 1, 1983. This patent discloses, for example, a flying apparatus which can carry a payload. The apparatus contains a flexible wing, a fuselage, with the flexible wing being connected to the fuselage by cables. The fuselage contains a motor and the fuselage usually does not have wings for creating a lifting force as in an ordinary air craft. The lifting force is done by the cable attached to the flexible wing.

This patent also discloses as an object that "the fuselage to be launched by rocket, or gun, or air dropped with packed wing and later in flight the wing may be deployed for powered and controlled aircraft or missile flight."

While the current invention uses known flexible wings, none of the prior art discloses using the flexible wings together with a space vehicle for placing a payload into orbit. Nor does the prior art disclose using a flexible wing as an aid to guiding a stage of a space vehicle into orbit.

SUMMARY OF THE INVENTION

Accordingly, a primary object of this invention is to provide a low-cost launch method for space vehicles that utilizes the aerodynamic lift provided by a flexible wing structure throughout a greater portion of the launch period.

It is a further object of this invention to use the lift of a flexible wing to efficiently launch a space vehicle using a lower thrust engine, such as an air breathing engine, than currently being used.

It is another object to utilize flexible wing surfaces to recover stages of the space vehicle.

A still further object is to use aerodynamic lift to maintain steady state vertical velocity against the gravity field.

A still further object is to make satellite launching practical from a great number of existing facilities at low cost.

The launch site does not require complex launch facilities and associated infrastructure costs.

A still further object is to place a payload into low earth orbit by using a conventional airfield supported by a hybrid aerodynamic launch system.

The objects of the present invention are fulfilled by providing a space launch system which has a space vehicle and a flexible lifting surface for achieving orbital altitudes for the space vehicle. The space vehicle and the flexible listing surface which can consist solely of a parafoil are connected to each other by means that allow the space vehicle and lifting surface to move relative to each other. The lifting surface can include at least one flexible lifting wing. The lifting wing can be, for example, a parachute, kite, parafoil or a multi-cell wing with various canopy constructions.

The system of the invention further includes automatic means for controlling the parafoil to achieve stability in flight.

The automatic means of the invention includes sensors and computing means allowing the parafoil to be steered to the right or left and to control pitch by using cables attached to the parafoil.

The space vehicle is first launched with the aid of an air engine and thereafter the flight of the space vehicle continues with the use of a rocket propellent motor which is started after the termination of the air engine. As the vehicle continues in flight, the air engine in a first stage of the vehicle which operates at a lower altitude than the rocket propellent engine, is disconnected from the space vehicle and is allowed to drop away. The air engine is in a first stage of the space vehicle and this first stage can be recovered by the use of a flexible lifting wing. The flight of the space vehicle continues with the aid of the rocket propellent motor and a flexible lifting wing. As the space vehicle gets close to orbit, the lifting wing is either jettisoned or disabled. Thereafter the space vehicle and payload associated with the space vehicle is placed in orbit and the payload, if seperate, is released in orbit. The second stage of the space vehicle which contained the payload can be recovered by the use of at least one flexible lifting wing.

One example of the launch process is that a multiple stage launch vehicle is used and the multiple vehicle takes off and flies, using an air-breathing system which brings the vehicle to approximately an altitude of 10 to 18 kilometers. The air-breathing engine is in a first stage of the space vehicle and the first stage is disconnected from the space vehicle and is allowed to drop away. After the first stage engine ceases to operate, the second stage engine, which is a rocket propellent engine, is operated and, using the take-off flexible wing such as a parafoil, the system flies at a velocity of from approximately 5.5 kilometers/second to orbital velocity and reaches an altitude of from approximately 70 to 110 Kilometers with variable vertical velocity.

The air-breathing engine stage can be recovered using a flexible wing surface such as a parafoil. Also, if desired, another engine can be used in this stage to help in recovery so that recovery can be made at a location significantly removed from the shut-down point of the air engine. Unpowered flight which would be aided by the flexible wing would allow for approximately 40 to 80 kilometers of recovery flight.

The second stage of the engine continues on its flight, but the flexible wing such as the parafoil now limits the vehicle acceleration, and is therefore either disabled or jettisoned. The second stage portion of the space vehicle has an engine and guidance system which is used to continue the acceleration and altitude gain to achieve orbit, and perform the orbital positioning of the payload. The payload can of course be satellite or any other payload that needs to be placed into orbit. Engine requirements for this process are not constraining so long as the thrust can be controlled. With the use of the HALS guidance system, there is no need for an expendable satellite system support. After the payload is released, the second stage may be recovered. This requires that the HALS second stage vehicle transfer to a lower (120-140 kilometer) orbit. If the payload is deployed at an altitude of below about 140 kilometers, this transfer is not required.

If recovery is performed, the second stage engine is used to initiate a slow de-orbit with a firing yielding a delta velocity of approximately 16 meters/second or more. Another flexible wing, such as a parafoil, is deployed and the recovery is performed with the aid of the parafoil.

In the method of the invention the air breathing engine operates for 25 minutes from launch to bring the space vehicle to an altitude of approximately 10 to 18 kilometers.

At approximately 34 minutes after launch the space vehicle is at an altitude of approximately 70 to 110 kilometers by using the rocket propellant motor. A payload is placed in orbit at least at an altitude of 120 kilometers. After orbit the altitude is lowered for re-entry.

With the system disclosed, which uses, for example, a parafoil to aid in the aerodynamic launch of orbital payload with the hybrid combination of the aerodynamics of the payload and the reaction forces of both the air breathing and conventional rocket propulsion engines. This combination aerodynamic performance can be performed with extremely light structural weights. With this low weight, the launch process can be performed at a low velocity and dynamic air pressure, with the resultant decrease in system stresses which are usually caused by, for example, thermal heating and structural loads.

By using an air-breathing engine to perform the initial launch and low altitude climb of the space vehicle, the atmospheric oxygen at these low altitudes can be used. These air engines are more efficient than the self-oxidizing rocket-fueled operation, although the air-breathing engine operates at a lower thrust level.

Because the space vehicle relies on the aerodynamic lift, rather than just engine thrust reaction to maintain its first critical steady state, these low thrust levels integrated over the long launch duration, provide a reasonable alternative to faster burn, high thrust launch trajectories.

High altitude flight is performed using the conventional rocket power motors, however, the aerodynamic lift provides a significant contribution, so lower thrust level operations are again practical. Low thrust enables very light motor stages to be applied, increasing the overall mass efficiency of the system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
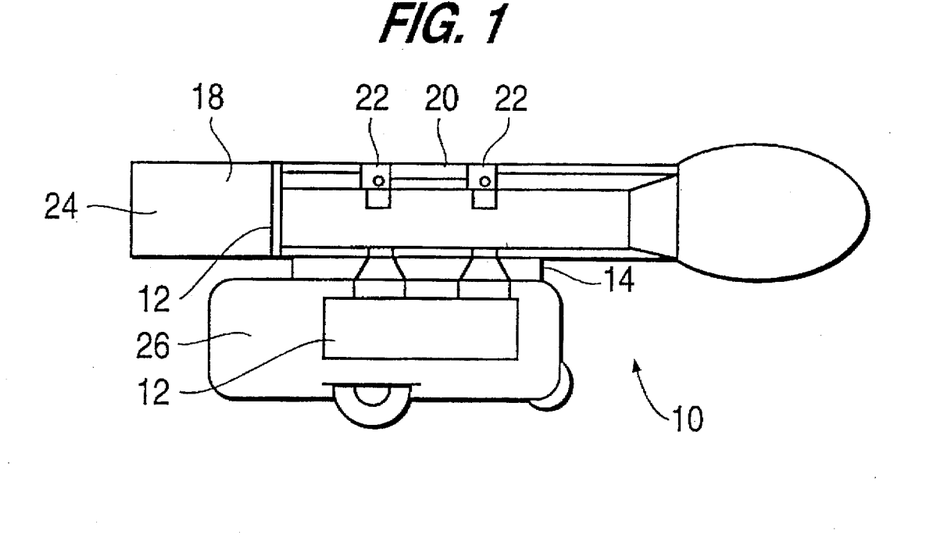
FIG. 1 is a cross-section in part of a space vehicle.

Referring to FIG. 1, space vehicle 10 includes a first stage 26 and a second stage 24. With each stage there are engines, the engines in the second stage being shown as element 18. There is a controller 14 for the space vehicle. Element 20 is a hatch that will open to allow a parafoil or flexible wing to exit from the second stage during recovery or flight. Also the flexible wing can be deployed prior to launch. Elements 22 are connectors for the flexible wing such as a parafoil.

Figure 2:
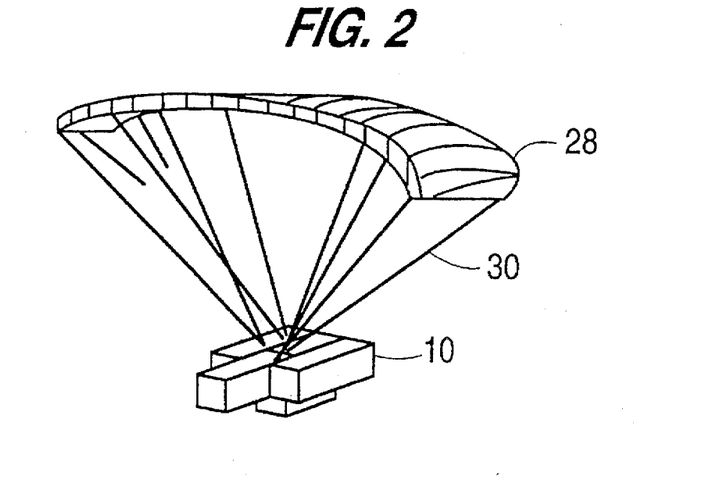
FIG. 2 is a perspective view of a space vehicle attached to a flexible wing.

FIG. 2 illustrates the space vehicle 10 with a flexible wing, such as a parafoil 28, being used. The parafoil 28 is connected to the space vehicle via ropes or cables represented by 30. There are a plurality of these ropes and cables, but only one has been identified for clarity.

Figure 3:
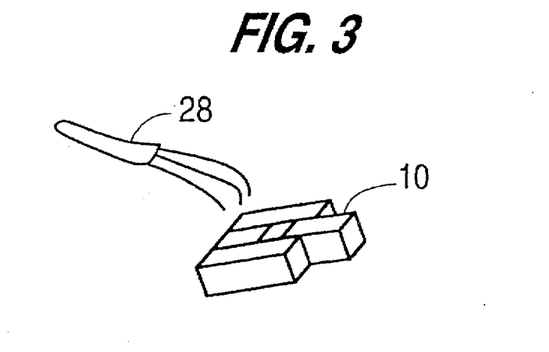
FIG. 3 is a perspective view of the space vehicle with a flexible wing being detached.

In FIG. 3, the space craft continues orbit and the parafoil or flexible wing with the ropes or cables jettisoned to prevent drag on the space vehicle as it enters the outer atmosphere.

Figure 4:
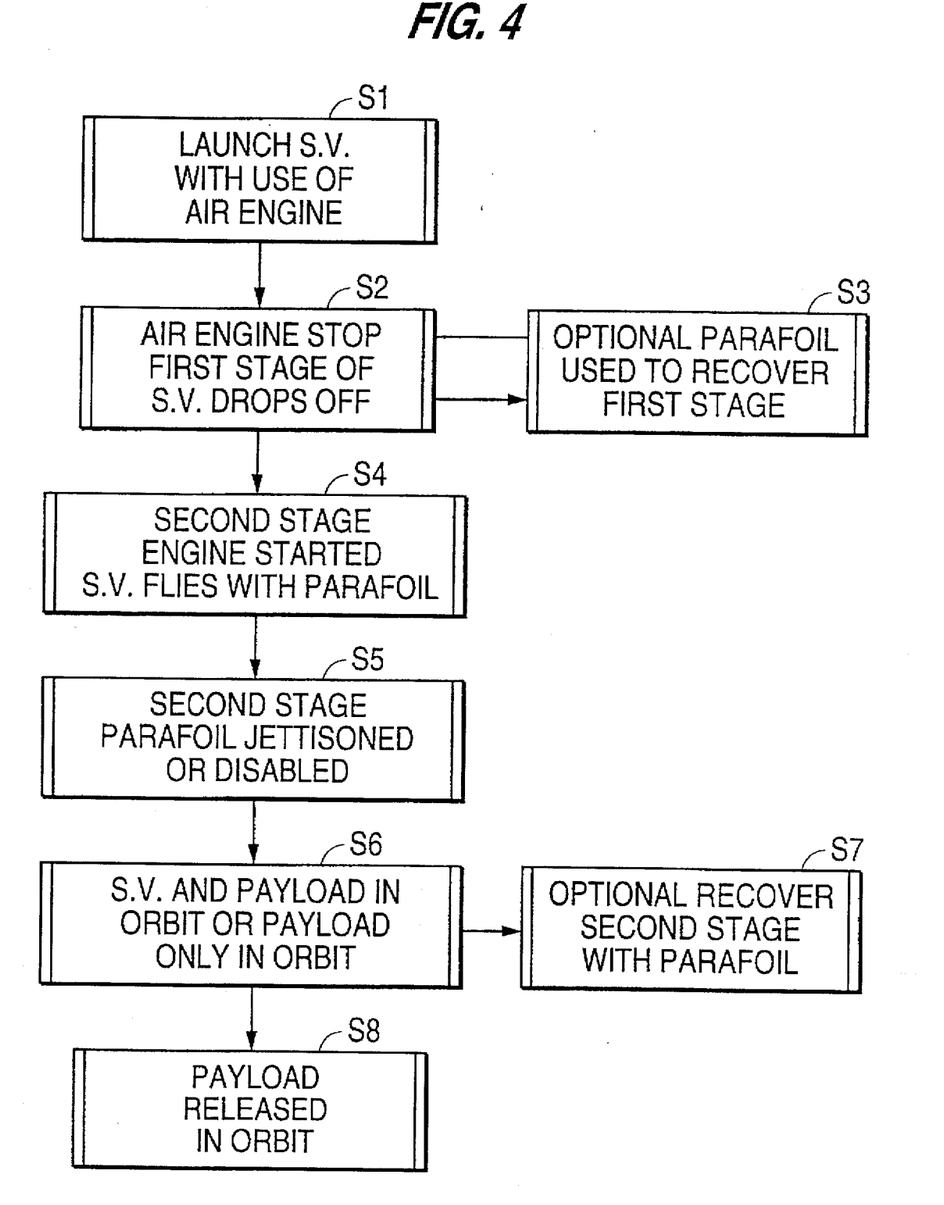
FIG. 4 is a flow chart illustrating the method of launching a payload into orbit.

FIG. 4 is a flow chart illustrating the steps of the space vehicle being launched into orbit. At step S1 the launch space vehicle is started with the use of an air engine. At step S2 the air engine stops after the space vehicle has reached an altitude of approximately 10 to 18 kilometers. The stage containing the engine is dropped off and optionally can be recovered using a flexible wing such as a parafoil as shown in step S3. After the air engine operation is terminated, the second stage engine, which uses a rocket propellent such as a liquid or solid fuel, is started up and the space vehicle flies with the aid of the same or another parafoil as shown in step S4. As the space vehicle gets into the outer atmosphere, the parafoil is jettisoned or disabled because it then becomes a constraint on the acceleration of the space vehicle. This is shown in step S5. The space vehicle and the payload associated with the space vehicle are placed in orbit in step S6 and the payload is released in orbit as shown in step S8. Optionally, the second stage can be recovered with the use of another parafoil as shown in step S7. Optionally, the second stage need not go into orbit, but the payload can be released and the second stage can, if desired, be recovered using another flexible wing such as a parafoil.

Figures 5A, 5B, 5C, 5D, 5E, 5F:
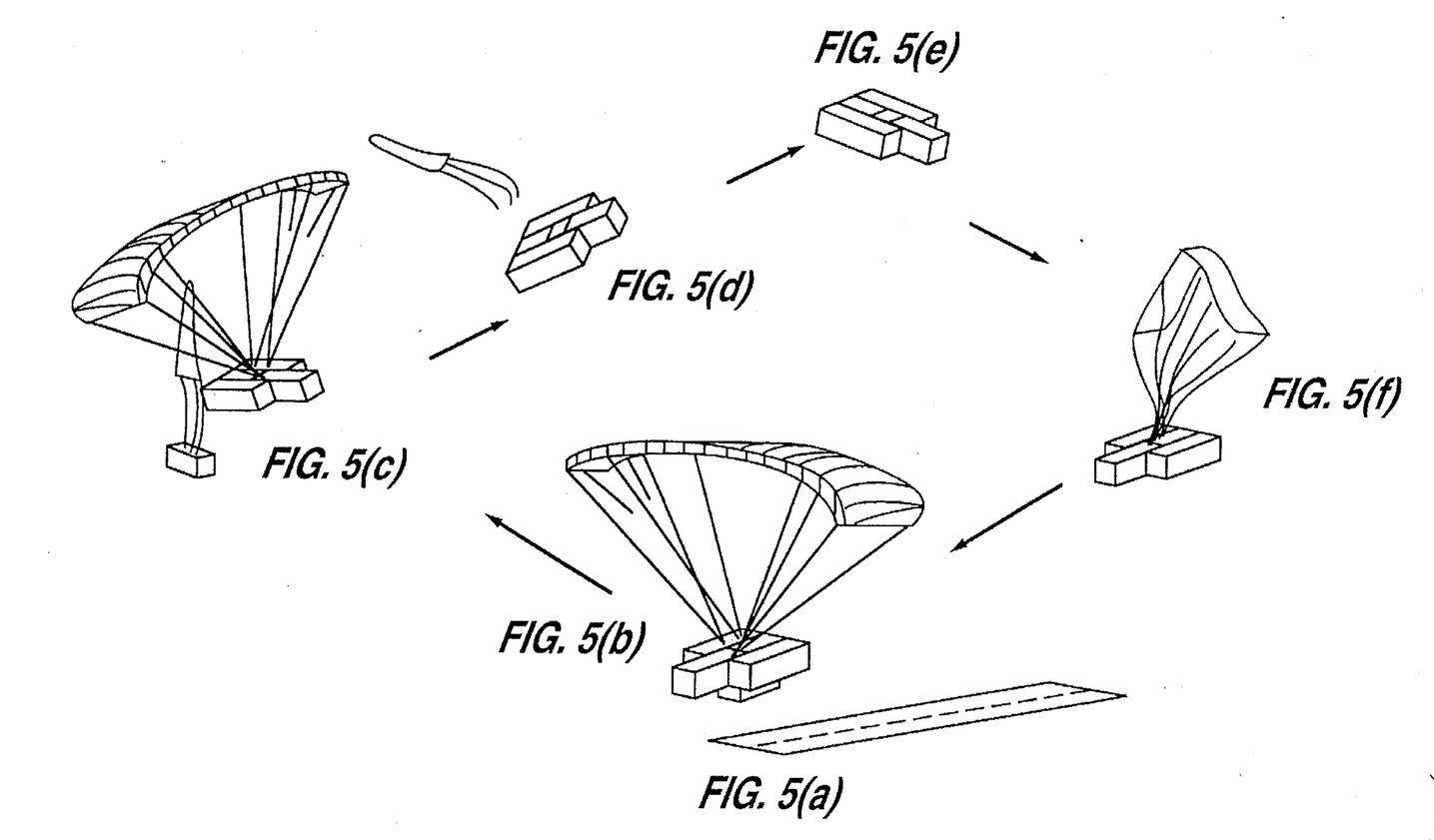
FIGS. 5(a) to 5(e) are a graphical representation of a flight profile.

In FIG. 5(a) there is illustrated a conventional runway. The launch apparatus with the parafoil takes off (FIG. 5(b)) using an air breathing engine and flies to approximately an 18 kilometer altitude FIG. 5(c).

At this altitude which is phase I of the flight, obtaining oxidizers from the local environment is at the limit of the operating capability of conventional airbreathing powerplants, due to the reduced air density. This airbreathing portion of the baseline HALS flight profile requires approximately 30 minutes, using maximum available thrust of a typical airbreathing engine. While this does not represent the optimal fuel efficiency, the time budget is better served by achieving maximum airbreathing altitude as quickly as possible and the weight budget for fuel consumed during this phrase has no impact on the critical Phase II, rocket thrusted portion of the flight.

After maximum altitude of the airbreathing stage is achieved (designed to be coincidental with the depletion of airbreathing fuel supply), the liquid or sold fueled second stage is initiated. A suite of throttleable rocket engines is cycled to deliver and maintain the optimum thrust-to-weight ratio for the craft as configured. For the baseline HALS vehicle, the thrust-to-weight ratio is between 1.0 and 1.5. For example, in one configuration, a 518 second long second-stage flight takes the vehicle from 18 kilometer altitude to 91.38 kilometers, with a burn out velocity of 7.8 kilometers/second by 39 minutes (FIG. 5(d)) after the initial ground launch. The payload is released at the point of maximum velocity for initiation of a payload insertion boost stage. FIG. 5(e). Upon payload release, the HALS vehicle initiates a gliding recovery 5(f).

Figure 6:
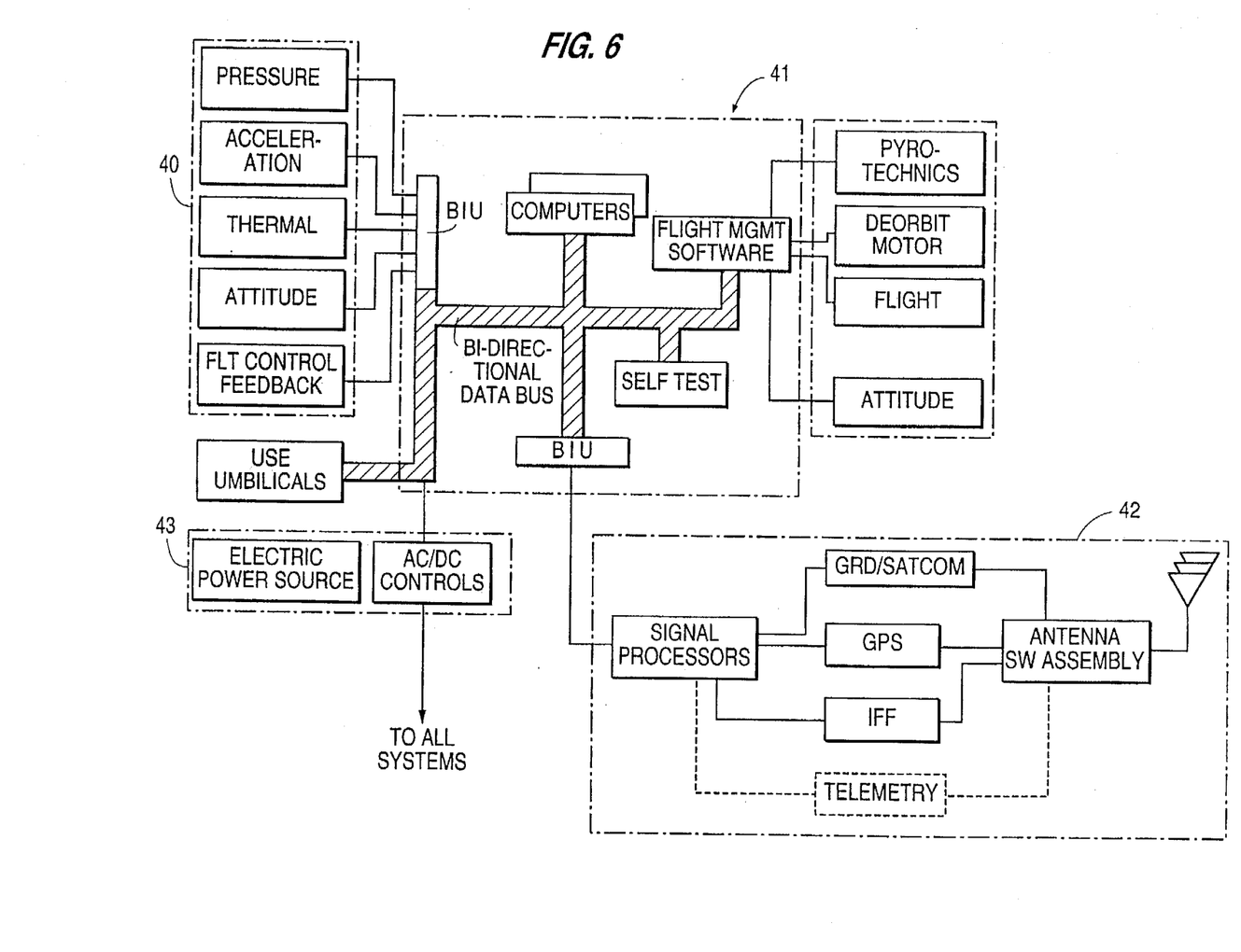
FIG. 6 is a diagram illustrating a control system used for achieving constant dynamic pressure and control during the flight process.

In FIG. 6 there is an illustrated Candidate Command, Control and Navigation System (CCNS) that can be used with a flight control interface to control the parafoil in flight. The control function are performed with actuators which physically control parafoil lines for right and left turns and pitch control. The CCNS include element 40 sensors, including pressure, temperature, acceleration, attitude and position. Data processing element 41, including redundant computers, interfaces, data bus, and software. Communications, element 42, including transceivers for the positioning system and ground links, and an Air Traffic Control Modes C or S transponder. Power Production/Controls are provided in element 43. [Material Deleted]

Thermocouple-type sensors with microprobes can provide the required digital outputs directly to the data bus. Typical of these sensors are the Platinum RTD microprobes, which offer long-term accuracy and excellent stability along with low power consumption.

Static and dynamic pressure can be measured using solid state miniaturized pressure transducers. These devices are capable of responding to the required pressure spectrum through use of circuitry fully compensated for temperature variations, with minimal sensitivity to extraneous acceleration, vibration and shock. In addition, their small diameter and minimum weight/volume are ideally suited to this type of application.

The Data Management System (DMS) will consist of a computer which will integrate sensor data through CCNS software to generate guidance and navigation commands via flight control, separation/pyrotechnics and communications interfaces.

On-board data processing will require a redundant capability to accept, process and use sensor data to provide guidance and navigation controls throughout the flight envelope.

In one example of flight, the space craft can be launched using an air breathing engine to an altitude of about 10 to 19 kilometers in twenty-five minutes. At this point, the air breathing engine ceases to operate and liquid fuel propulsion is used to achieve a velocity of 5.5 kilometers/second to an altitude of about 90 kilometers. At this point, the parafoil which can alternatively be used during original launch or deployed during the liquid stage is jettisoned. The liquid or solid fuel engine and the guidance system are used to continue acceleration and orbital positioning of the payload at, for example, 120 to 5,000 kilometers. The liquid or solid fuel engine can be used to initiate a slow deorbit.

The parafoil will undergo stresses in operation. This is noted in the Space Object Assisted Recovery Final Technical Report prepared by the assignee of this application.

A HALS wind tunnel test was performed in order to evaluate the survivability of the parafoil's non-rigid structure in the high Mach environment required by the HALS and SOAR program. In summary, this environment will entail operations in the range of aerodynamic regions shown in Table B-1.

TABLE B-1

| HALS Environment | |
| --- | --- |
| Dynamic Pressure (Q) | 4.9–25 $Kg.mtr^2$ |
| | 1.0–5.0 $lb/ft^2$ |
| Altitude Kilometers | 0–88.0 |
| Mach | 0–27 |

This environment cannot be readily simulated in any existing test facility due to the high equivalent altitude (low air density), and the high Mach number. Considerable design flexibility exists in configuring the parafoil for this mission; however, its basic operation must be first assured. To provide a "quick look" at parafoil survival, it was decided to utilize the closest available test environment, and to limit the initial test objectives to establishing whether the parafoil could operate in a stable regime at high Mach flow conditions, without excessive surface flutter, aerodynamic heating, or supersonic flow impingement onto its surfaces.

Of particular concern to the thermal analysis was the position of the stagnation region in relationship to the parafoil ram air inlet duct. If the stagnation region was appropriately propagated in front of the test article, then thermal radiation into the parafoil surface would be reasonably low due to the distance from the surface (due to the $R^3$ rule), and the low proportion of radiative energy that would be intercepted by the surface. In this case, the equilibrium surface temperatures would remain within the region where practical, nonrigid, materials could be applied, and where no hypersonic flow would flow close to the wing surface. Conversely, if the stagnation region was within the inlet itself, excessive thermal energy would radiate into the structure, and equilibrium temperature would exceed acceptable limits. The radiative transfer is the dominate heat transfer mode in the region where thermal performance constrains system design. At lower altitudes, where convective transfer modes are significant, the velocity is too low to produce significant thermal effects. This preliminary testing was not intended to provide performance parametrics, or to develop stability models of the system. Initial test objectives are shown in Table B-2.

TABLE B-2

| Test Objectives | |
| --- | --- |
| Dynamic Pressure (Q) | 124 $Kg/mtr^2$ |
| | 60–200 $lb/ft^2$ |
| Duration | 30 Seconds |
| Mach | 2.5 |

This proposed wind tunnel test environment is significantly more stressful to the parafoil than the HALS vehicle will ever experience, but is the best that was achievable within a limited test program using existing test facilities.

The tunnel utilized for this testing was the Hypersonic Wind Tunnel at the Lockheed Aeronautical Systems Company gas dynamics complex in the Kelly Johnson Research Center. This tunnel was recently (1987) reactivated and refurbished.

The tunnel is an open jet blowdown type. High pressure air is supplied by a series of compressors, dehydrated, and heated to 1200° F. (at 550 psi) for use in the tunnel. Air is exhausted by a series of pumps, capable of providing a system blank off pressure equivalent to an altitude of 55 Kilometers, when all pumps are in series. To relate this to HALS flight, at 55 Kilometers altitude the HALS vehicle will be flying only at approximately Mach 2.0. A summary of the tunnel characteristics (as provided by Lockheed) are shown in Table B-3.

TABLE B-3

| Tunnel Characteristics | |
| --- | --- |
| Type | Blowdown to exhausters |
| Nozzle | Axisymmetric countered |
| Mach Number | 8.0 |
| Total Pressure | 100 to 450 psia |
| Total Temp | 800 to 1,000° K. |
| Dynamic Pressure | .46 to 2.0 psi |
| Reynolds Number | 0.5 to 2.1 |
| 10⁶/ft | Run Time 3 to 5 |
| mins | Nozzle Exit Diameter |
| 27.34 | in Max |
| Model Blockage | 12.0 in² |

To operate the tunnel, air is admitted to the stilling chamber through a porous sleeve and a fast retracting throat plug, to assure an instantaneous start of the Mach flow. Successful flow establishment requires that initial dynamic pressure be higher than that required to subsequently maintain the hypersonic flow. In the case of this experiment, this leads to an initial dynamic pressure several times above the desired operational pressures.

Two test articles were prepared for this test. The smaller was 3 inches by 5 inches (wing dimensions) and the larger was 5 inches by 7 inches. The parafoil surfaces, and connecting rib structure, were constructed of 0.026 inch thick Kevlar™ aramid weave cloth, with rise lines fabricated from multiple Kevlar™ strands, with an average thickness of less than 0.005 inches. The model was attached to a fixed base plate that could be rotated in pitch to adjust the model angle of attack, with the riser line attachment outside of the tunnel flow region.

The nature of the blowdown type tunnel is such that Mach flow must be initially established almost instantaneously. Thus, the model could not be allowed to go through the normal parafoil opening deployment sequence at the high dynamic pressure. The model was therefore suspended in the tunnel in an open (deployed) position, to allow it to fly immediately after flow was initiated. This attachment consisted of a flexible Kevlar™ line running through the upper leading edge surface. When the model was generating lift, the lift forces raised the model above this suspension axis, and the suspension system provided only a degree of roll control to the model. This had no effect on the experimental goals, as the experiment was not designed to determine or develop parafoil stability criteria.

Figure 7:
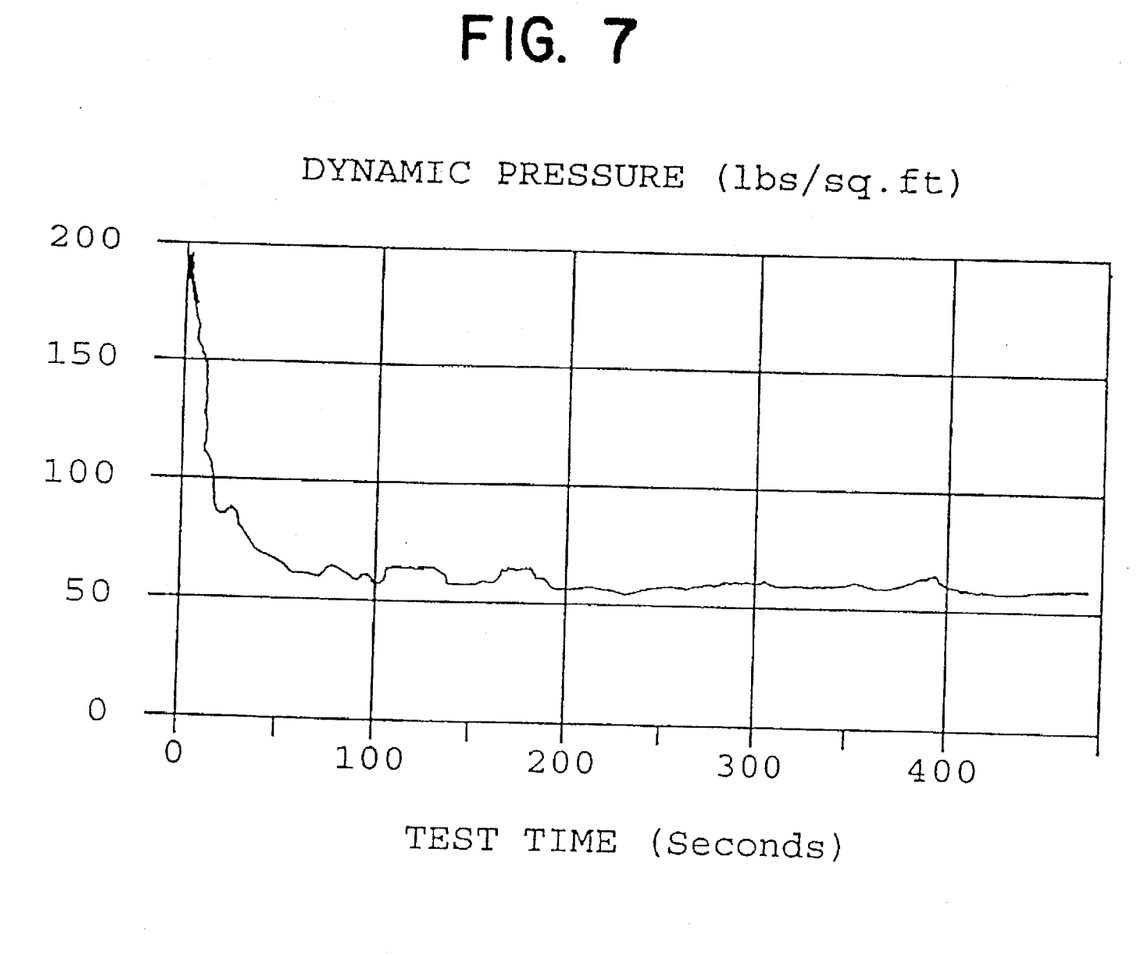
FIG. 7 is a chart illustrating tunnel dynamic pressure during a test.

Specific dimensions and angles of attach for this test article (while operating in the tunnel) are difficult to ascertain, as the test article was extremely small; and minor stretching of the seams produced a considerable change in article geometry. Testing of the HALS parafoil was performed through a complete run of the available exhaust and air supply systems. The range of dynamic pressure is shown in FIG. 7. As can be seen, the model was subjected to an initial dynamic pressure is shown in FIG. 7. As can be seen, the model was subjected to an initial dynamic pressure in excess of 200 lbs/ft²; but tunnel operation was slowly established at a level of approximately 55 lbs/ft² for the remaining duration of the test. During the initial minute of testing, some high frequency oscillation was apparent in the pitch axis. This vibration was completely eliminated when the angle of attack was increased from approximately 1° to its ultimate value of 4°. At this angle, no oscillatory behavior was evident, and the test article flew in a stable configuration for the duration of the test period. The flow velocity in FIG. 7 was MACH 8.15 during the entire period.

At the completion of this run, the article was examined for damage. Some minor fraying was apparent where the riser lines entered the hypersonic flow region (the base was in a stagnant flow region). Some minor scorching of the dye on the Kevlar was also visible at several points, but no thermal damage was evident, and no areas appeared to be excessively heated.

The test performed in this analysis had limited objectives, but the results appear to validate the concept that a flexible wing can operate in a high Mach, low dynamic pressure environment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A space launch system for placing a payload into earth orbit comprising:
   a space vehicle;
   flexible lifting wing surface means for achieving orbital altitudes of said space vehicle; and
   means for directly connecting said space vehicle and only said flexible lifting wing surface means in spaced relationship to each other so that the flexible lifting wing surface means and said space vehicle can move independently and relative to each other.

2. The system of claim 1, wherein said flexible lifting wing surface means consists essentially of a parafoil and said means for directly connecting includes cables.

3. The system of claim 2, further including automatic means for controlling the parafoil to achieve stability in flight.

4. The system of claim 3, wherein said automatic means includes sensors and computing means.

5. A method of launching a payload into an orbital flight by using a space vehicle comprising the steps of:
   (a) launching the space vehicle with the aid of an air engine to a first stage of flight;
   (b) continuing the flight of the space vehicle with the use of a rocket propellent motor which is started after the start of the air engine; and
   (c) actuating a parafoil connected to the space vehicle during step (b) so that the space vehicle and the parafoil can move independently and relative to each other in flight.

6. The method of claim 5, further including the step of:

disconnecting the air engine from the space vehicle to allow it to drop away.

7. The method of claim 6, further including the step of:

recovering the air engine with the use of a second parafoil.

8. The method of claim 5, wherein the parafoil is jettisoned or disabled before orbit is achieved.

9. The method of claim 5, wherein the space vehicle and payload are placed in orbit.

10. The method of claim 5, wherein the payload is detached from the space vehicle and placed in orbit; and the space vehicle does not orbit.

11. The method of claim 5, wherein the payload is released in orbit.

12. The method of claim 11, wherein the space vehicle is recovered by the use of a parafoil.

13. A method of launching a payload into an orbital flight by using a space vehicle combined with a parafoil comprising the steps of:

(a) launching the space vehicle with the aid of an air engine to a first stage of flight;

(b) continuing the flight of the space vehicle with the use of a rocket propellent motor which is started after the start of the air engine, (c) actuating for use a parafoil directly connected to the space vehicle so that the parafoil and space vehicle can move independently and relative to each other in flight.

14. The method of claim 13, wherein the parafoil is actuated during step (b).

15. The method of claim 13, wherein the air breathing engine operates for 25 minutes from launch to bring the space vehicle to an altitude of approximately 18 kilometers.

16. The method of claim 15, wherein at approximately 34 minutes after launch the space vehicle is at an altitude of approximately 75 kilometers by using the rocket propellant motor.

17. The method of claim 16, wherein a payload is placed in orbit at least at an altitude of 120 kilometers.

18. The method of claim 17, wherein after orbit the altitude is lowered for re-entry.

* * * * *